(12) United States Patent
Kovalev et al.

(10) Patent No.: US 11,924,530 B2
(45) Date of Patent: Mar. 5, 2024

(54) THERMALLY STABLE SAWMILL SCANNER

(71) Applicant: JoeScan, Inc., Vancouver, WA (US)

(72) Inventors: Vadim Kovalev, Vancouver, WA (US); Samuel Berezhinskiy, Palm Coast, FL (US); Jason Farmer, Vancouver, WA (US); Joseph Nelson, Vancouver, WA (US)

(73) Assignee: JoeScan, Inc., Vancouver, WA (US)

( * ) Notice: Subject to any disclaimer, the term of this patent is extended or adjusted under 35 U.S.C. 154(b) by 29 days.

(21) Appl. No.: 17/817,315

(22) Filed: Aug. 3, 2022

(65) Prior Publication Data

US 2023/0132784 A1 May 4, 2023

Related U.S. Application Data

(60) Provisional application No. 63/263,317, filed on Oct. 29, 2021.

(51) Int. Cl.
*H04N 23/51* (2023.01)
*H04N 23/56* (2023.01)
*H04N 23/90* (2023.01)

(52) U.S. Cl.
CPC ............ *H04N 23/51* (2023.01); *H04N 23/56* (2023.01); *H04N 23/90* (2023.01)

(58) Field of Classification Search
CPC .... G01N 21/8986; G01N 33/46; G01B 11/00; G01B 11/002; B27B 1/00; B27B 29/08; B27B 31/00; B27B 7/04; B27B 13/00; B27B 29/10; B27B 31/04; B27B 31/08; E04D 13/0354; E06B 3/10
USPC .............................................. 348/82
See application file for complete search history.

(56) References Cited

U.S. PATENT DOCUMENTS

| 5,088,363 | A * | 2/1992 | Jones ...................... B27B 31/06 144/357 |
| 6,466,305 | B1 * | 10/2002 | McBain ............... G01B 11/024 356/3.08 |
| 2004/0246473 | A1 * | 12/2004 | Hermary .............. G01B 11/245 356/237.1 |
| 2009/0255607 | A1 * | 10/2009 | Barker ................. G06Q 20/208 144/357 |
| 2014/0251499 | A1 * | 9/2014 | Barker .................... B27B 1/007 144/402 |

* cited by examiner

*Primary Examiner* — Masum Billah
(74) *Attorney, Agent, or Firm* — Klarquist Sparkman, LLP (57) ABSTRACT

A sealable housing for an optical scanner includes at least one surface operable to float with respect to other housing surfaces. An O-ring can be situated about a perimeter of a lid an inserted into a container to define a sealed volume. The lid can serve to remove heat while one or more container surfaces are used to establish optical axis directions for one or more optical systems.

21 Claims, 12 Drawing Sheets

THERMALLY STABLE SAWMILL SCANNER

CROSS REFERENCE TO RELATED APPLICATION

This application claims the benefit of U.S. Provisional Patent Application No. 63/263,317, filed on Oct. 29, 2021, which is incorporated herein by reference in its entirety.

FIELD

The disclosure pertains to housings for optical systems.

BACKGROUND

Optical scanners can be used in a sawmill to provide log dimensions, permitting optimum use of each log. In some cases, a laser line beam is projected onto a log surface while the log is simultaneously translated on a carriage and a camera views the log with the projected line beam and acquires data on log shape. Multiple laser line beam zones can be used to provide 3D log profiles for use in determining how each log should be further processed.

Sawmills present a challenging environment that makes precise, repeatable scanning difficult. Challenges includes wide temperature ranges, moisture, vibration, dust as well as the need to operate reliably so that production need not be interrupted to service scanner systems. These challenges are particularly difficult in high resolution scanning in which even small positional errors must be avoided. For these and other reasons, improved scanning approaches are needed.

SUMMARY

In some examples, scan assemblies comprise a scan assembly housing that defines an interior volume, the scan assembly housing including a side wall having a sealing surface portion situated proximate a top of an interior surface. A lid is provided that includes an inward extension having a sealing surface that faces the interior surface the sealing surface portion of the scan assembly housing. At least one compressive seal is situated between the sealing surface portion of the scan assembly housing and the sealing surface of the lid, wherein the scan assembly housing and the lid, as assembled, compress the compressive seal so that the interior volume of the scan assembly housing is sealed by the lid. In examples, at least one light source is operable to project a patterned beam and at least one camera situated to image the projected patterned beam, wherein the at least one light source and the at least one camera are secured to the scan assembly housing and are situated in the interior volume. In examples, the at least one camera includes a first camera and a second camera situated so that respective camera axes intersect a measurement volume irradiated by the light source. An image processor can be coupled to the first camera and the second camera and configured to transmit coordinates associated with imaging of the patterned beam wherein the image processor is thermally coupled to the lid. In some embodiments, the interior ribs define coupled cavities in an interior of the scan assembly housing and wherein each rib has a sealing surface portion contiguous with the sealing surface portion. At least one light source is operable to project a patterned beam and at least one camera situated to image the projected patterned beam having respective optical axes, wherein the at least one light source and the at least one camera are secured to the scan assembly to orient respective optical axes. The at least one light source can be thermally coupled to the lid and mechanically coupled to the scan assembly housing. In examples, the at least one light source is a line beam source, and the optical axes of the first camera and the second camera are at angles of between 5° and 45° with respect to the axis of the line beam source, and the first camera and the second camera are situated equidistant from the line beam source, and the optical axes of the first and second cameras and the line beam source are coplanar. The first camera and the second camera can be secured to a bottom of the scan assembly housing that is opposite the lid and mechanically coupled to the scan assembly housing and thermally coupled to the lid. In some examples, the axes of the first camera and the second camera are situated symmetrically with respect to an axis of the patterned beam. The first camera and the second camera can be secured so that respective camera axes intersect. A data communication port that is operable to provide data communication for the scan assembly can be provided and a scanner power supply coupled to the data communication port and operable to power the first camera, the second camera, and the at least one light source based on at least one electrical input to the data communication port.

In some examples, a synchronizer is coupled to the data communication port to receive time stamped encoder data and global timing data. In further examples, fasteners are situated to secure the lid to the scan assembly housing, wherein each of the plurality of fasteners is made of a material having a thermal conductivity of less than 20 W/m/K. In an example, the fasteners are Hastelloy screws. The side wall of the scan assembly housing can include a seal guide portion that is coupled to the sealing surface portion, wherein the seal guide portion is situated proximate a top of an interior surface of the housing. The lid can include on O-ring groove, and the sealing surface of the lid is situated in the O-ring groove. The at least one light source can include at least one pulsed laser.

Methods comprise securing at least one optical system to a first housing portion, the optical system having an optical axis associated with receiving or delivering an optical beam. Electrical power is provided to the at least one optical system with a communication connection and heat associated with the at least one optical system to a thermally coupled second housing portion. The first housing portion can be secured to a second housing portion to define an enclosure so that the first housing portion is decoupled from thermal expansion of the second housing portion. The securing can produce a piston seal between the first housing portion and the second housing portion.

The foregoing and other features and advantages of the disclosed technology will become more apparent from the following detailed description, which proceeds with reference to the accompanying figures.

DETAILED DESCRIPTION

Introduction

The disclosure pertains to methods and apparatus that permit stable alignment of optical systems even in the presence of large temperature variations, particularly temperature variations produced by heat generated in the operation of the optical systems and any associated processing hardware. In many practical application, optical systems are situated to receive an optical beam or transmit an optical beam along an axis that remains stable, even as portions of a housing that enclose or support the optical system expand and contract in response to operation of the optical system or to environmental changes. In some examples, one, two, three or more optical systems are secured to one or more portions of a housing or other support, while other portions of the housing or support are used to remove heat from the enclosure. The examples are described below with reference to optical scanning assemblies for use in sawmills, but the disclosed methods and apparatus can be used with other optical assemblies or other systems in which stable mechanical alignment is needed and are particularly suited for applications in which optical systems must function in difficult environments due to heat, dust, vibration, humidity, or other environmental conditions.

Scanning optical assemblies typically use semiconductor lasers whose useful life is limited by migration of defects into the laser active area where they function as optical absorbers. Absorption increases temperature around the defect which in turn reduces the bandgap of the semiconductor. As the bandgap narrows, the material absorbs more light leading to reduced performance and sometimes a runaway absorption process that leads to catastrophic optical damage. Minimizing the temperature of the device slows the migration of defects and increases laser useful life. One way to minimize temperature is to leave a laser off when a scanner is not actively exposing an image with the laser. Thus, pulsing the laser can increase laser useful life. The disclosed approaches permit the use of pulsed semiconductor lasers and can provide control of pulse timing.

Spatial resolution and accuracy are superior when objects are suitably close to a scanner. Scanning large boards with high accuracy therefore requires multiple scanners. In this case, scanners can be installed such that the projected laser lines touch at the edges. For example, to scan a 20 foot board, 10 adjacent scanners can be used. In this case, the scanners are mounted 2 feet apart, each scanner having a laser illuminating a 2 foot section of the board and all 10 lasers effectively producing a single 20 foot long laser line, or scan zone, down the length of the board. In such a configuration, when one scanner is taking an image, lasers associated with any adjacent scanners are to be turned off. To provide ample scan data, both the exposure time of each image and the time between images is preferably minimized or reduced. To ensure that scanners do not take images that overlap temporally, the scanners must be synchronized temporally. This is frequently done with a separate electrical input to the scanner, sometimes called a sync line, the synch line providing a clock signal that each scanner can use to time scans. When assembling data from multiple scanners to build an image of a board or log, a process must receive a signal or other indication of board location when each scan was taken. This is frequently accomplished by attaching an encoder to a conveyance that moves the board through the scan zone. The encoder signal is frequently delivered to each scanner with yet another electrical input.

Scanners typically have at least two electrical connectors, one for data and one for all other signals, for example, timing, encoder signals and power. The data connection is often a standard RJ45 connector, however, the second connector is typically a custom connector that adds cost and complexity associated with cable routing and management and also adds another layer of complexity associated with trouble shooting when something goes wrong. For this reason, it would be advantageous to perform all these functions over the data cable. Further, as discussed above, deformations of the scanner housing over temperature are to be reduced or avoided for successful use in challenging environments. Larger housings needed for multiple electrical connections have larger deformations. Reducing a number of electrical connections permits a housing size to be reduced and including all the required functionality into a single connector such as a single RJ45 connector can reduce beam pointing errors. It can be especially convenient to use a single RJ45 connector and connect to scanners use ethernet to provide power as well as data and control communications.

General Considerations and Terminology

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation. For convenience, some examples describe containers and walls of such container s are referred to as side walls or container bottoms or floors. Surface from which optical beams are emitted or to which optical beams are directed are referred to as front surfaces.

As used herein, the term "housing" refers to a container that defines a cavity that can enclose at least portions of optical systems such as laser beam sources and detectors as well as electrical systems used in operation of the laser beam sources and detectors. The term "housing" is also used to refer to selected portions of an enclosure such as, for example, a rectangular or cylindrical box that is closed with by a lid. Cross-sections of housings can have polygonal, oval, elliptical or other simple or complex shapes and housings can define multiple cavities that can be coupled via passages or be uncoupled. For convenience, some examples area described with reference to an enclosure formed by a rectangular box having a lid that is securable to the box to form a sealed housing. A lid can be configured to close any end of a housing.

In some examples, compressive seals are situated to be compressed by two or more surfaces associated with a housing. Such compressive seals can be made of rubber, plastic, or other compressible materials and formed as flat gaskets or other shapes, but O-rings are especially convenient. In some examples, container lids seal an interior volume using compressive seals that are compressed by one or more interior surfaces of a container. The lid and container are referred to as being thermo-mechanically isolated because thermal expansion, contraction, or warping of the lid and the container are uncoupled to each other by the compressive seal. In typical examples, the lid is then used as a heat sink for optical and electrical systems situated within the housing such as camera systems, light sources such as pattern beam sources, laser line scanners, imaging processing circuitry, communication and networking hardware, electrical power convertors and power supplies such as switch mode power supplies. In these examples, optical systems are secured to the housing and expansion of the lid is thermo-mechanically uncoupled from the container by the compressive seal, tending to allowing optical axes associated with the optical systems to be maintained or subjected to acceptably small deviations. Alternatively, the container can serve as a heat sink, and optical systems secured to a lid.

The compressive seals used in some examples can be referred to as "piston seals" as a compressible material such as an O-ring is situated to seal side surfaces of a housing and a lid so that the lid can move in and out of the cavity formed by the housing without subjecting the housing to forces that would tend to deform the housing.

In the disclosed examples, optical beams such as laser beams are directed toward a target that is to be measured. These beams are generally patterned beams, i.e., beams such as line beams, multi-line beams, beams comprising a plurality of illumination areas arranged along a line or in two or more dimensions, or other configurations. Two or more cameras are generally situated to have axes that are directed to a common measurement volume to be incident to a common target.

Any of the examples and features of the examples disclosed below can be combined with any other examples and the associated features.

Example 1

Figure 1:
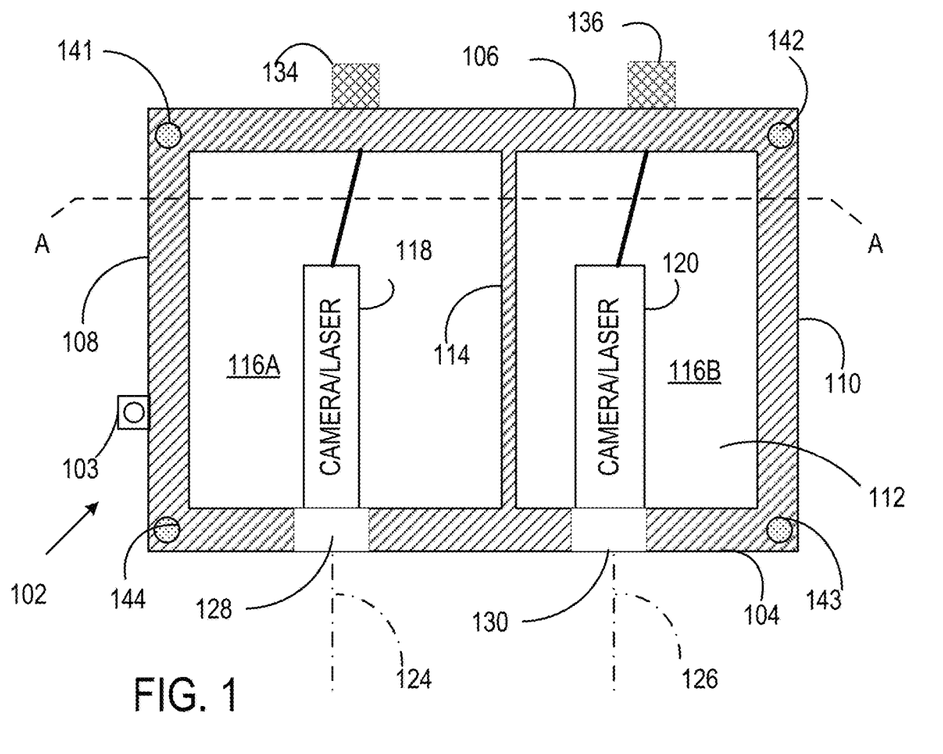
FIG. 1 is a plan view of a scan assembly housing.

Referring to FIG. 1, a container 102 has a front wall 104, a back wall 106, side walls 108, 110 and a bottom 112. An intermediate wall 114 extends between the front wall 104 and the back wall 106 to define cavities 116A, 116B. In the example of FIG. 1, one or more optical systems 118, 120 are secured to the front wall 104 and have respective optical axes 124, 126 that can be associated with directing optical beams from or to optical systems. For example, one or both of optical systems 118, 120 can be imaging systems or line beam generators or other optical systems. Optical windows 128, 130 permit optical radiation to enter or exit the container 102 while sealing the cavities 116A, 116B. In some cases, the optical systems 118, 120 include optical windows and additional windows are not required. A tab 103 secured the container 102 can be used to align optical axes 124, 126 or other portions of the housing 102 can be used for mounting and alignment. In the example of FIG. 1, two optical systems are shown, but in other examples 2, 3, 4, or more optical systems can be provided along with associated cavities. In still further examples, two or more optical systems are situated in a single cavity. One or more electrical connectors 134, 136 are secured to the container 102 and provide power, data communication, data acquisition, and control signals for the optical systems 118, 120. Fastener portions 141-144 are provided in the enclosure walls so that a such as illustrated in FIG. 1B can be secured to the enclosure 102.

Figure 1A:
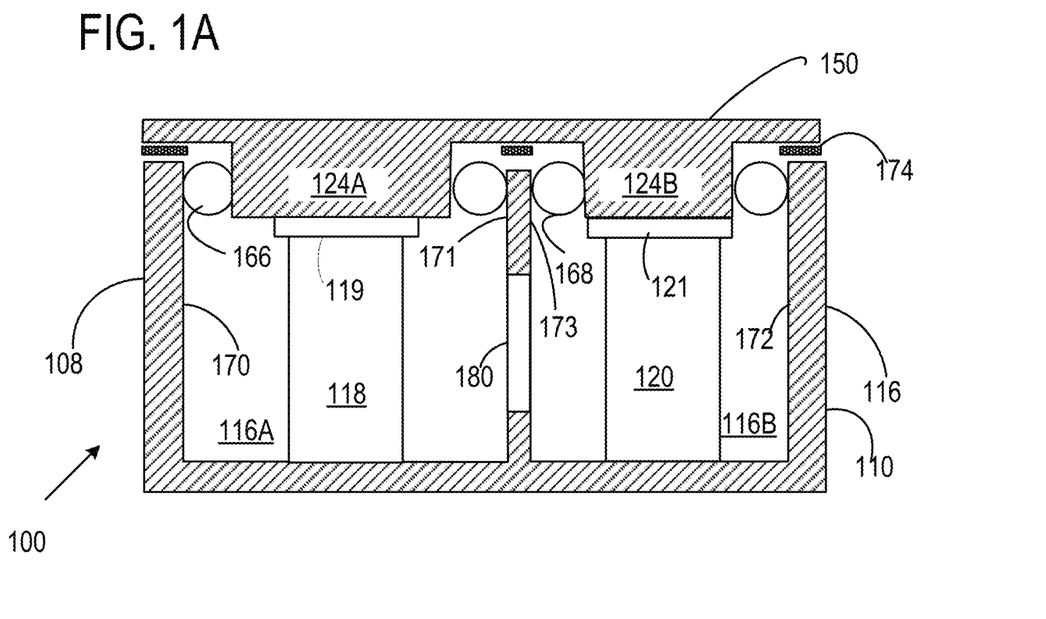
FIG. 1A is a sectional view of the scan assembly housing of FIG. 1.
Figure 1B:
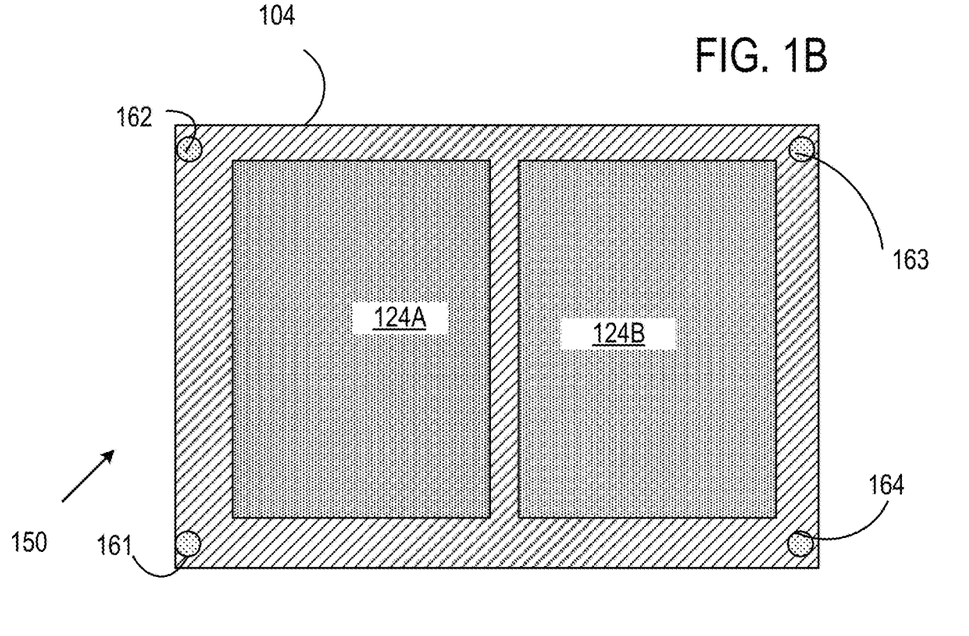
FIG. 1B is a plan view of a lid operable to seal an interior volume of the scan assembly housing.

Referring to FIG. 1B, a cover 150 includes protrusions 124A, 124B (shown as extending out of the plane of FIG. 1B) that extend into the cavities 116A, 116B, respectively of FIG. 1 with the cover 150 connected to the container 102. Through-holes 161-164 corresponding to fastener portions 141-144 are provided to connect the lid 150 to the container 102 with screws or other fasteners.

FIG. 1A is a sectional view of an enclosure 100 defined using the cover 150 and the container 102. The container 102 is sealable to the protrusions 124A, 124B with compressive gaskets 166, 168 such as O-rings that contact and are compressed by inner surfaces 170, 172 of respective container sides 108, 110 and surfaces 171, 173 of the intermediate wall 114. In some cases, portions of inner surfaces and/or interior wall surfaces are machined or polished to promote sealing with a gasket. The enclosure 100 thereby decouples thermal expansion, contraction, and warping (or other dimensional changes of the cover 150) from the container 150. The cover 150 is secured to the container 150 and separated with a flexible spacer 174 so that the cover 150 and the container 102 are mechanically isolated. Compression of the gaskets 166, 168 by deformation of the cover 150 typically does not provide sufficient force to deform the container 102 and the axes of the optical systems secured to the container 102 (such as at the front wall 104) are not significantly disturbed.

Gasket seals as illustrated are robust and permit the use of optical systems in such enclosures in difficult environments. This sealing mechanism permits the cover 150 to move into and out of the container 102 and is referred to herein as a "piston seal." In this configuration, one more sealed cavities such as cavities 116A, 116B are formed that are suitable for enclosing optical components, electronic systems, and other hardware to be shielded from environmental problems such as dust and humidity. In addition, because any warping, expansion, contraction of the lid 150 is substantially uncoupled to the container 102, the lid 150 can serve as a heat sink. As shown in FIG. 1A, thermally conductive plates 119, 121 thermally couple the optical systems 118, 120 to the lid 150. In other examples, optical systems can be secured to a lid and thermally coupled to a container so that the container serves as a heat sink. While two cavities are used in this example, one, two, three, or more can be provided.

Figure 1C:
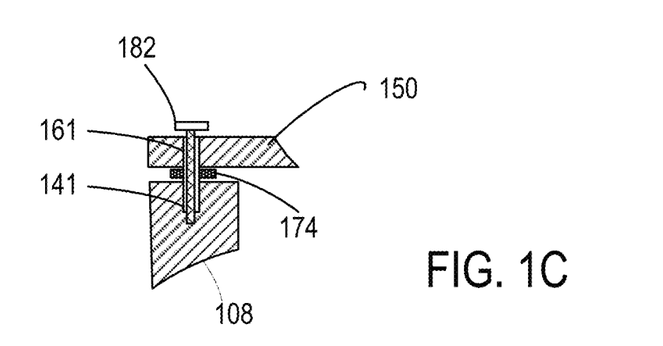
FIG. 1C illustrate securing the lid of FIG. 1B to the scan assembly housing of FIG. 1.

The lid 150 and the container 102 can be coupled together with fasteners such as screws, rivets, or other fasteners. As shown in the partial sectional view of FIG. 1C, a screw 182 in inserted into through hole 161 and into threaded bore 141. The spacer 174 is compliant, permitting the lid 150 and the container 102 to be fixed to each other while still permitting the enclosure 102 to be substantially isolated from any mechanical changes in the lid 150. As shown in FIG. 1C, an aperture 180 permits wires and other electrical connectors and/or fill gas to be coupled into both the cavities 116A, 116B.

Example 2

Figure 2:
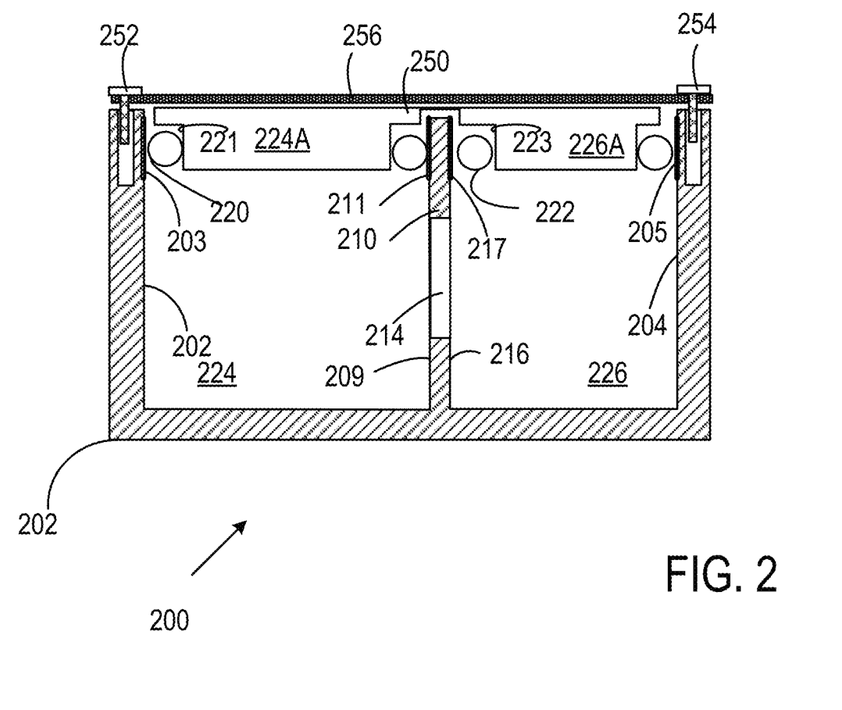
FIG. 2 illustrates an alternative housing and lid that are sealable with a piston seal.

Referring to FIG. 2, an example enclosure 200 includes a lid 250 that is coupled to a container 202 to define cavities 224, 226. Interior surfaces of the enclosure 202 further include sealing surface 203, 205 that are situated to contact O-rings 220, 222. An interior wall 209 includes interior surfaces 210, 216 that further include contact surfaces 211, 217 situated to contact the O-rings 220, 222, respectively. The lid 250 includes projections 224A, 226A corresponding to the cavities 224, 226, respectively and having contact surfaces 221, 223. The lid 250 can be coupled to the container 202 with screws such as representative screws 252, 254 that secure a flexible cover 256 to the container 202. The cover 256 can also be fastened to the lid 250 with rivets, adhesives, or other fasteners. An aperture 214 is defined in the interior wall 209 to permit wires and other electrical connectors to pass between the cavities 224, 226 and fill gas to be coupled into both.

Example 3

Figure 3A:
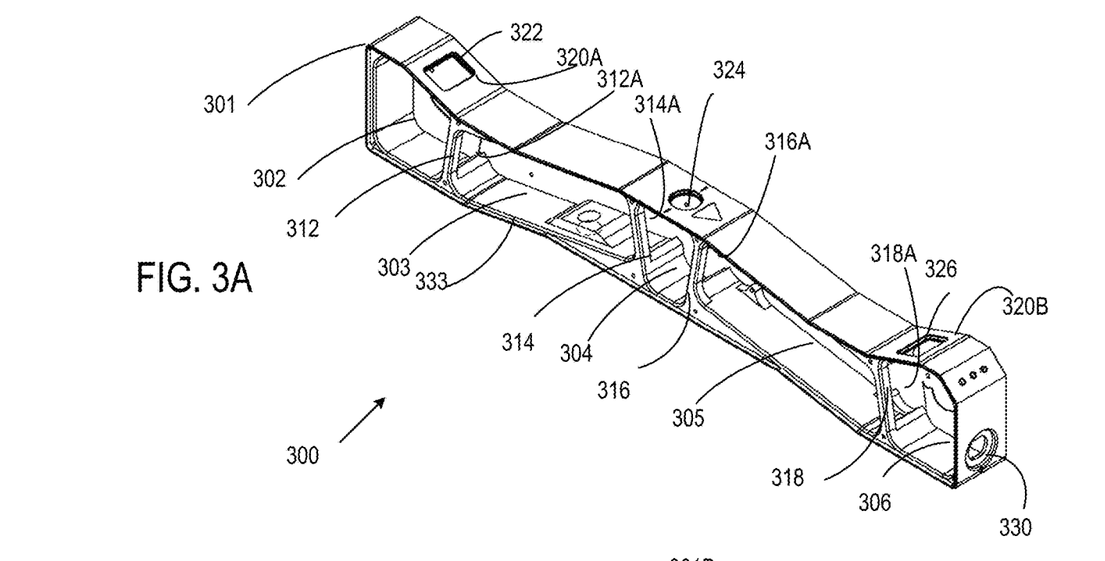
FIG. 3A is a perspective view of a scan assembly housing in which multiple cavities are defined.
Figure 3B:
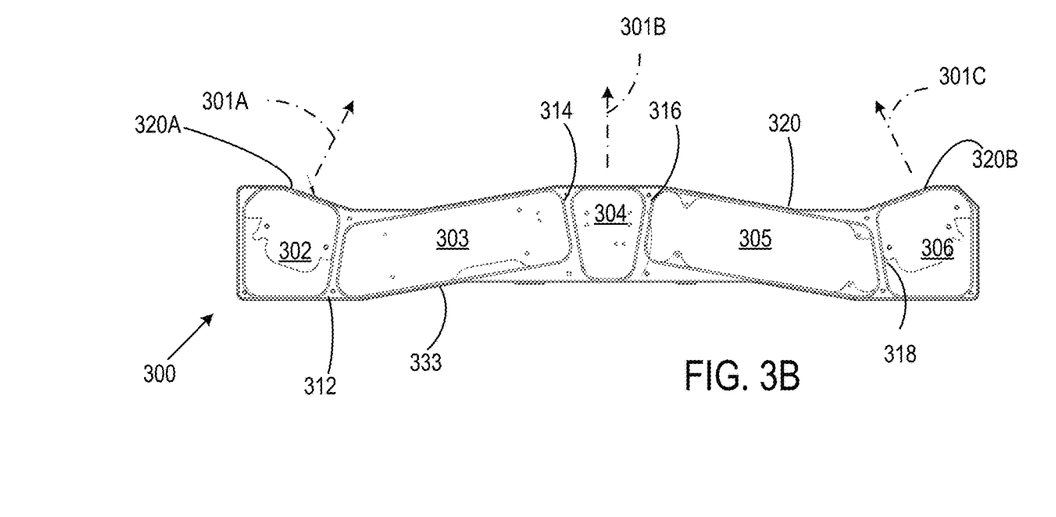
FIG. 3B is a plan view of the scan assembly housing of FIG. 3A.

Referring to FIGS. 3A-3B, a container 300 defines cavities 302-306 that can retain optical systems, processor systems, amplifiers, power convertors, communications interfaces, or other optical, electrical, or computational systems. As shown, the cavities 303, 304, 306 are coupled to respective apertures 322, 324, 326 that permit transmission and reception of optical radiation and are defined in an exterior wall 301. Typically, optically transmissive windows are situated in the apertures to seal the cavities. In one example, the cavities 322, 326 retain camera systems and the cavity 324 retains a patterned beam source such as a line beam generator. Faces 320A, 320B of the enclosure 300 are angled so that optical axes 301A-301C associated with the cavities 302, 304, 306 intersect. The axes 301A, 301C are symmetric about the axis 301B, but other arrangements are possible. The cavities 302-306 are separated by interior walls 312, 314, 316, 318 that include respective apertures 312A, 314A, 316A, 318A so that the cavities 302-306 are internally coupled. A top surface 333 is configured for forming a piston seal as discussed in detail below (see FIG. 3E) and aperture 330 is provided for a communication connector or cable, such as an Ethernet or USB connector or cable as wells as a power cable, or power can be derived from Ethernet or other communication connections.

Figure 3C:
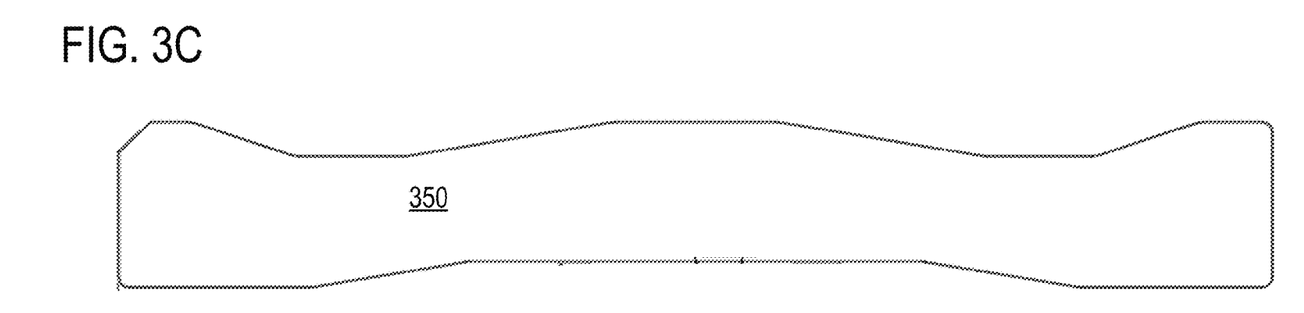
FIG. 3C is an elevational view of a lid for the scan assembly housing of FIGS. 3A-3B.
Figure 3D:
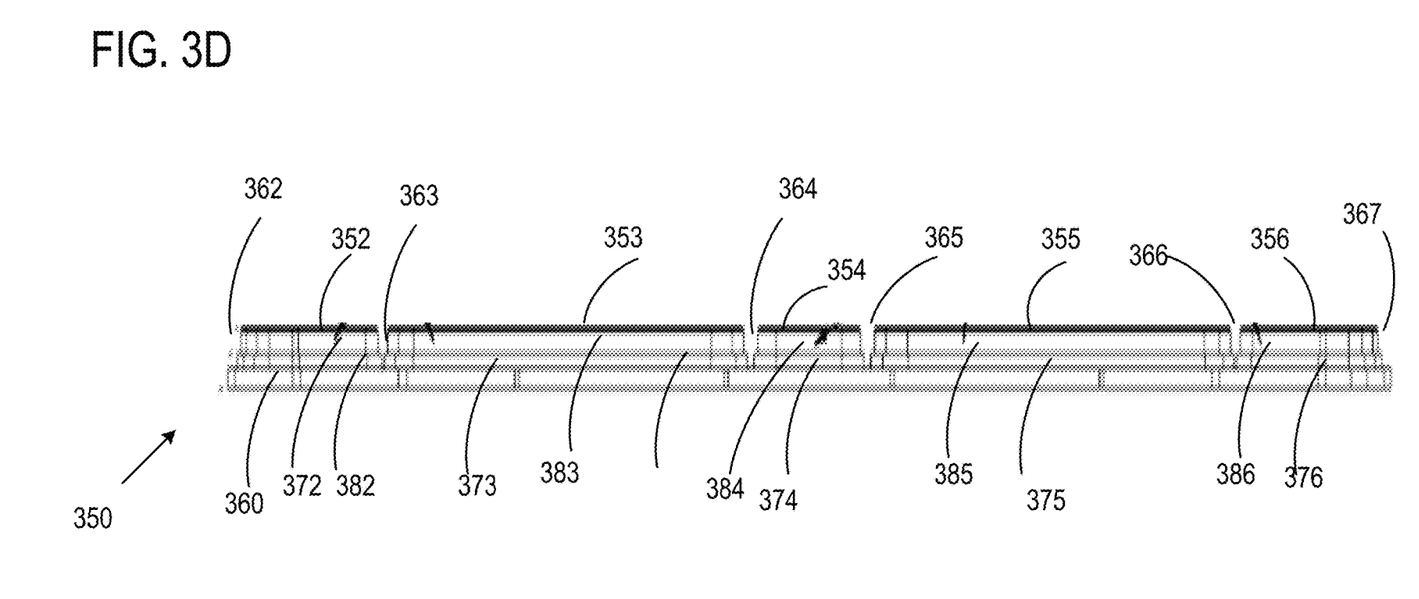
FIG. 3D is a plan view of the lid of FIG. 3C.

Referring to FIGS. 3C-3D, a lid 350 for the container 300 includes projections 352-356 corresponding to cavities 302-306. The projections 352-356 extend from a plate 360 and have by O-ring sealing areas as indicated at 362-367 for establishing seals with the container exterior wall 301 and the interior walls 312-318. The projections 352-356 include respective first step portions 372-376 and second step portions 382-386. As assembled to the container, a respective seal is formed at each projection with an O-ring, but in other examples, a single perimeter O-ring can be used.

Figure 3E:
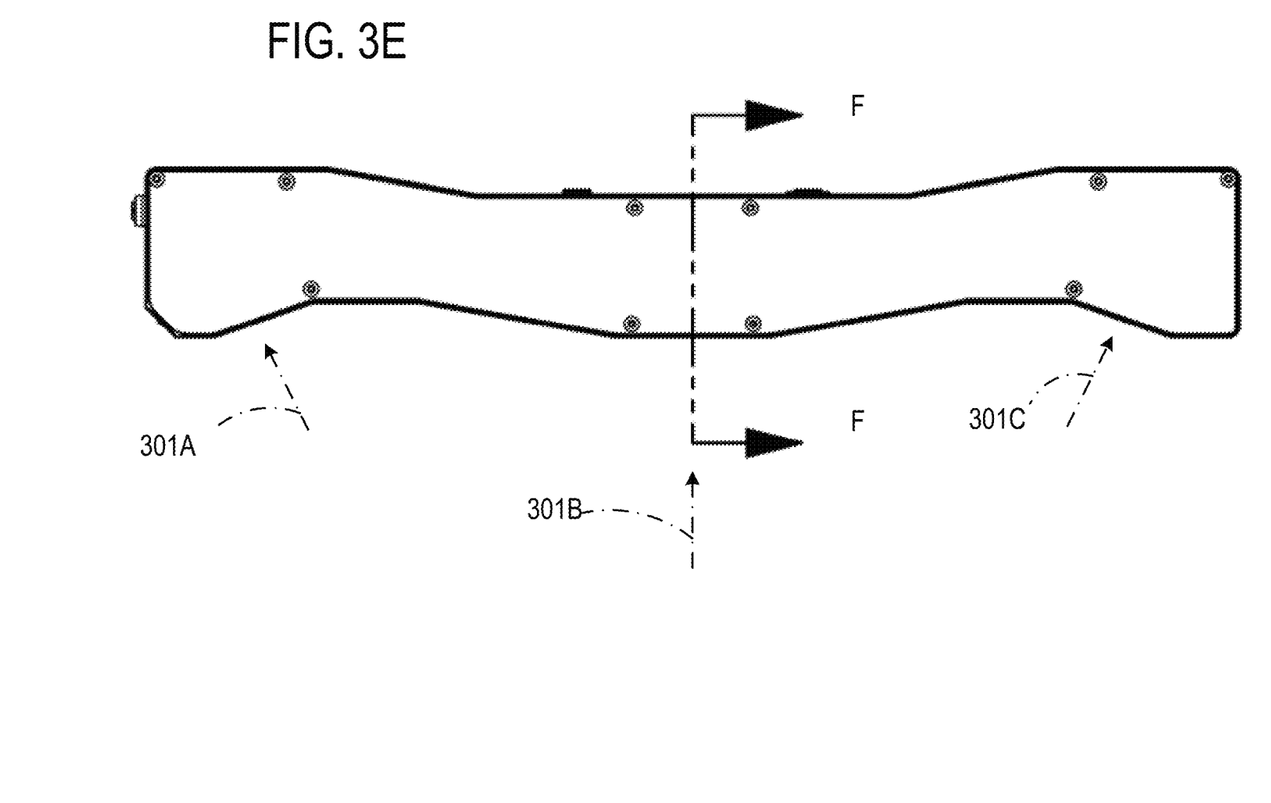
FIG. 3E illustrates optical axis directions associated with the scan assembly housing of FIG. 3A.
Figure 3F:
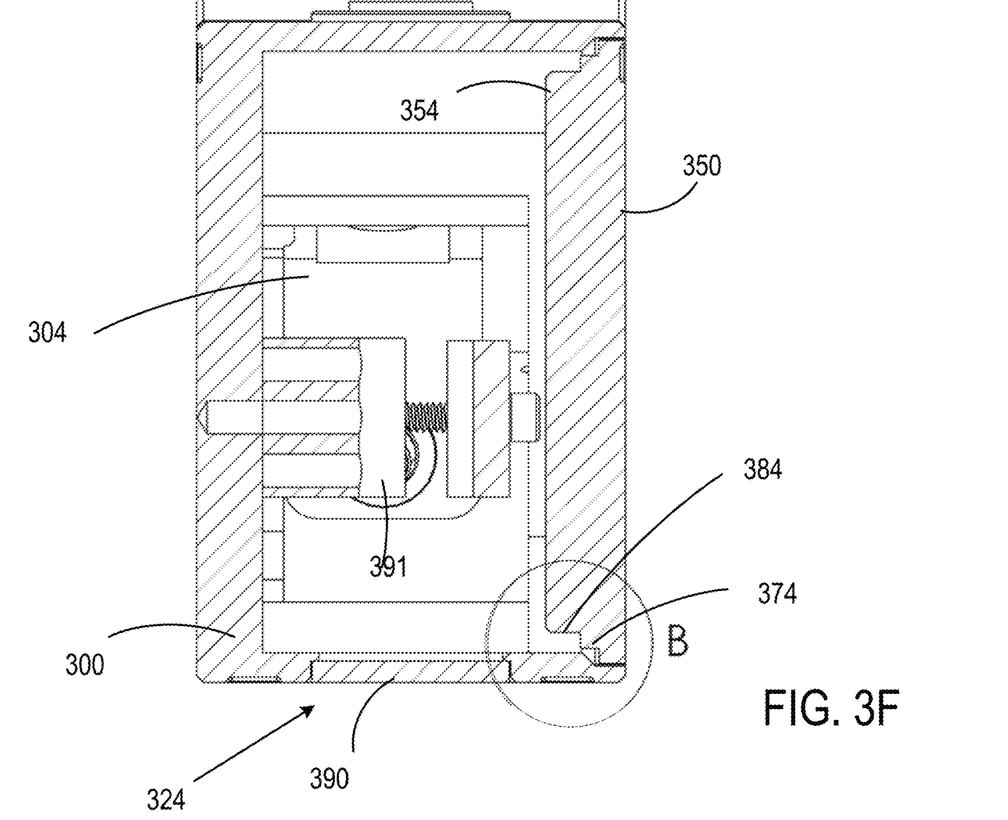
FIGS. 3F-3G are sectional views illustrating a compressive seal situated to seal the lid of FIG. 3C to the scan assembly housing of FIG. 3A.
Figure 3G:
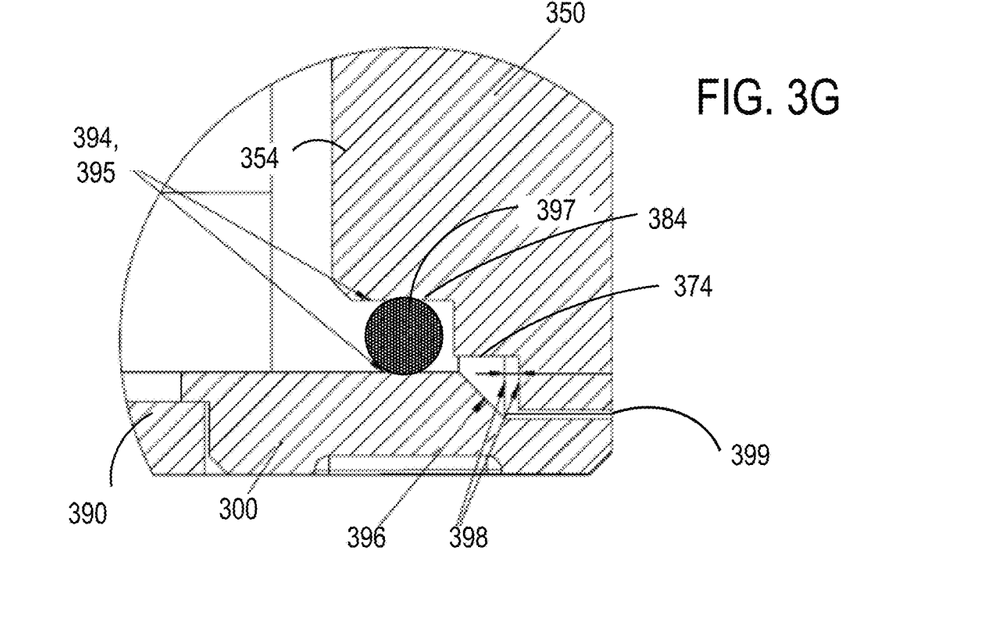

FIG. 3E is a plan view of an enclosure formed with the lid 350 and the container 300 showing the orientation of the optical axes 3011, 301B, 301C. Referring to the sectional view of FIG. 3F, a representative electrical or optical assembly 391 is situated in the cavity 304 and the lid 350 and the projection 354 as well as the step portions 374, 384. Referring to the partial sectional view of FIG. 3G, an O-ring 397 is situated between sealing surfaces 394, 395 of the lid 350 and the container 300, respectfully. A window 390 is situated in the aperture 324. A beveled surface 396 and stepped surfaces 374, 398 facilitate O-ring placement while sealing the lid 350 to the container 302. A gap 399 separates the lid 350 and the container 300 so that thermal expansion, contraction, warping, or other deformation of the lid 350 do not tend to alter the container 300.

Example 4

Figure 4:
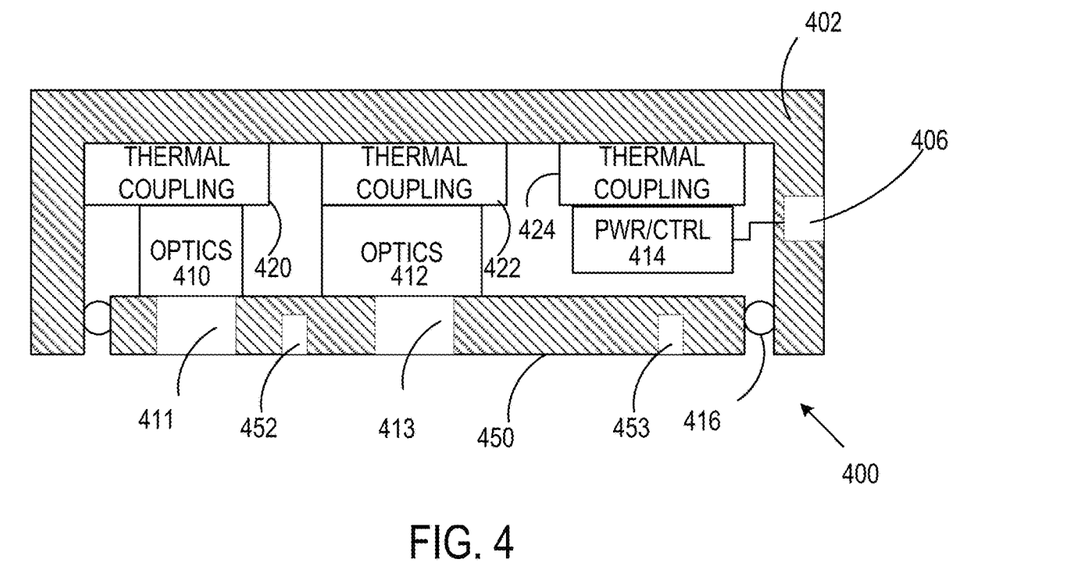
FIG. 4 illustrates a method of sealing an optical housing in which a portion of the optical housing is used as a heat sink and is thermo-mechanically separated from other portions of the optical housing.

Referring to FIG. 4, an enclosure 400 is formed of a lid 450 and a container 402 that are sealed with an O-ring 416. Apertures in the lid 450 are configured to retain optical windows 411, 413 that permit optical beams to be transmitted and received with optical systems 410, 412, respectively. In this example, the optical systems 410, 412 are secured to the lid 450 which can be secured as needed using threaded holes 452, 453, or other fasteners. The optical systems 410, 412 are thermally coupled to the container 402 with thermal coupling members 420, 422. An electronic system 414 can include a power convertor, communication interface, camera and scan control systems or other components and is thermally coupled to the container with a thermal coupling member 424. In typical examples, power and communication are provided from a connector 406 using, for example, power over ethernet. A power convertor can be configured to provide suitable voltages and currents for various components, but not all such connections are shown for clarity of illustration.

Example 5

Figure 5A:
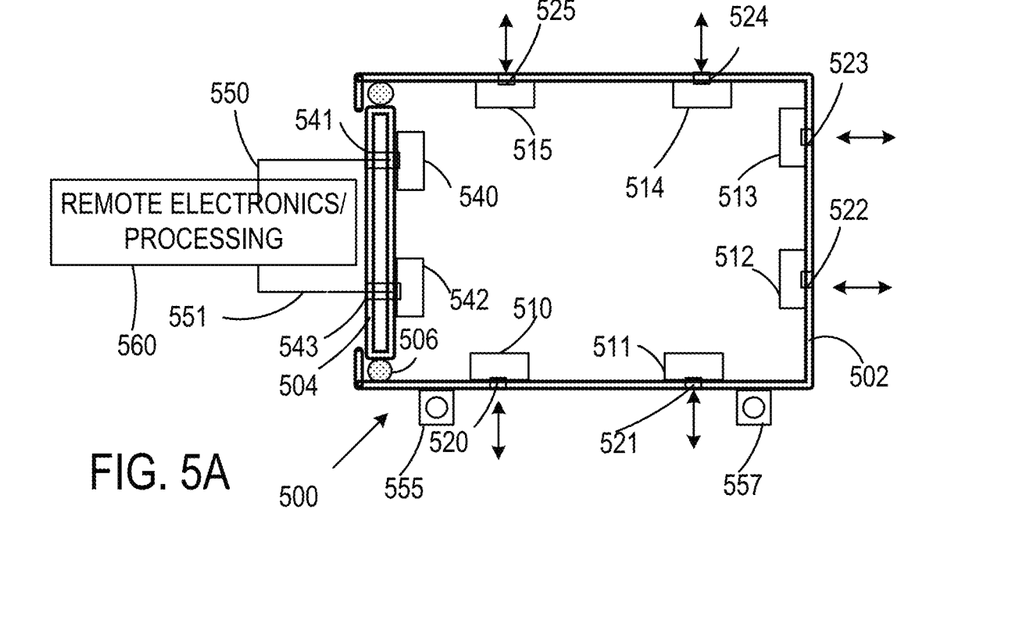
FIG. 5A is a sectional view of a representative housing have a thermally uncoupled end.

Referring to FIG. 5A, an assembly 500 includes a container 502 and a container end 504 that is thermo-mechanically uncoupled from the container 502 with an O-ring 506. Top and bottom lids are not shown and, in this example, the container 502 has a rectangular box shape. Other shapes can be used as may be convenient. The O-ring 506 extends about a perimeter of the end 504 so that the end 504 is movable with respect to the container 502. As shown, optical systems 510-515 such as detection systems (for example cameras) or illumination systems receive or direct radiation via apertures 520-525 defined in the container 502 as indicated by the arrows. Electrical systems 540, 542 can be secured to the end 504. Typically, at least some portions of the electrical systems are thermally coupled to the end 504. Electrical connectors 541, 543 are coupled to cables 550, 551, respectively for communication with remote electronics or processing systems indicated at 560. The container 502 is generally secured to establish optical axis directions for the optical systems 510-515 and deformation of the end 504 during operation generally tends to not change optical axis directions. For example, mounting flanges 555, 557 can be secured to the container 502. Alternatively, optical systems can be secured to the end 504 and electrical systems secured to the container 502 so that the container 502 is allowed to move in response to heating or environmental changes while the end 504 remains fixed. In addition, top and bottom lids that are fixedly secured to the container 502 can also be used for optical system mounting. In some cases, some electrical systems or components can be secured to the same surfaces or parts to which optical systems are secured.

Example 6

Figure 5B:
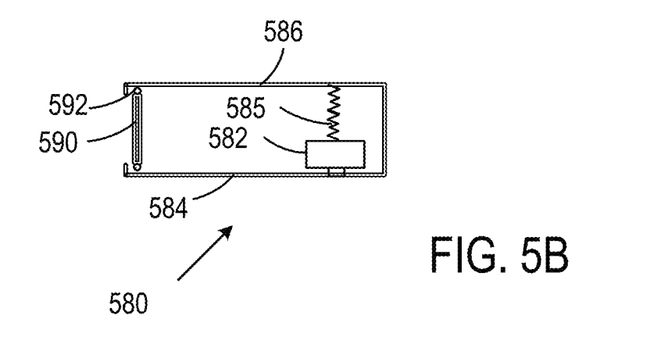
FIG. 5B illustrates an optical system aligned by being pressed toward a reference surface defined on a housing.

While an optical system can be secured to a wall of a container for alignment, in some examples an optical system is aligned by urging one or more portions onto a reference surface defined in container wall. For example, as shown in FIG. 5B, an enclosure 580 contains an optical system 582 that is urged toward a container wall 584 that is secured to an opposite container wall 586. by a spring 585. A container led 590 is coupled to form a piston seal using an O-ring 592.

Example 7

Figure 6:
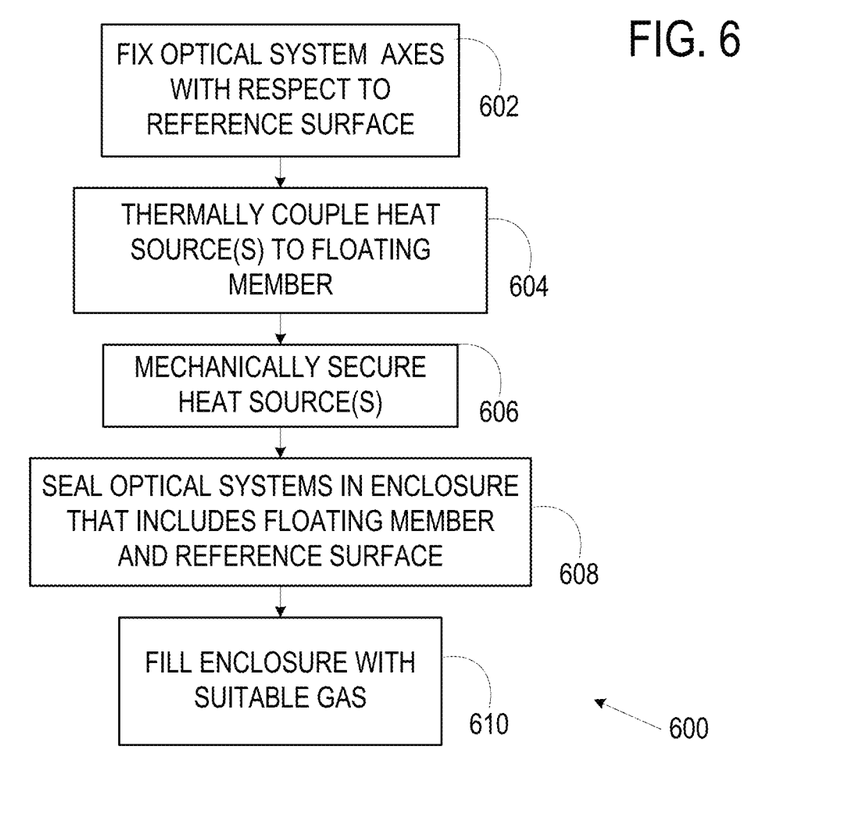
FIG. 6 is a block diagram of a representative method of thermo-mechanically uncoupling an optical alignment surface from a heat sink portion of an enclosure.

Referring to FIG. 6, a method 600 includes providing an optical reference surface and fixing an optical axis of at least one optical system based on the optical reference surface at 602. In some cases, the optical reference surface is a mounting surface for one or more optical systems. In other examples, optical axes of one or more optical systems are determined using the reference surface by, for example, pressing the optical system toward the reference surface using a spring or other flexible member with the optical system secured to a different surface. At 604, heat sources such as associated electronics area coupled to a floating member and mechanically secured at 606. At 608, the enclosure is sealed and at 610 can be filled with a suitable gas.

Example 8

Figure 7:
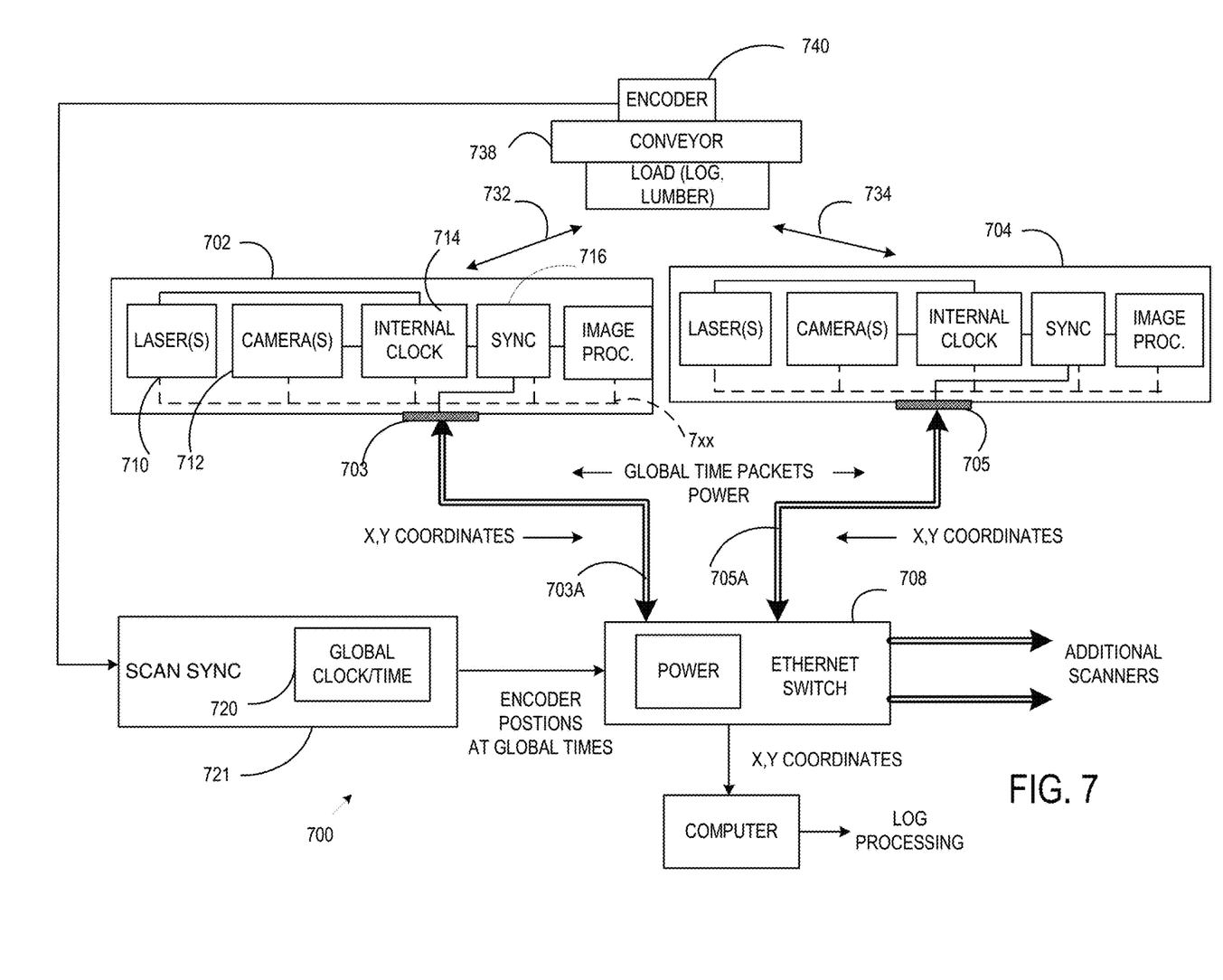
FIG. 7 illustrates a multi-scanner system.

Referring to FIG. 7, a representative multi-scanner system 700 includes first and second scanners 702, 704 that are coupled by single connectors 703, 705, respectively, to an ethernet switch 708. Additional scanners can be provided but are not shown for convenient illustration. The scanner 702 includes one or more lasers 710, cameras 712, an internal clock 714, a synchronizer 716, an image processor 717. The lasers 710 can be configured to produce continuous or pulsed beams, and as noted above, the use of pulsed beams can permit lasers to last longer. Other scanners such as the scanner 704 can be similar. The internal clock 714 includes one or more oscillators that can provide timing information and timing is aligned with so-called global timing provided by a scan timing synchronizer 721 to the ethernet switch 708. Typically, the oscillators in the internal clock 714 exhibit drift; and are not accurate enough to maintain synchronization of multiple scanners. For this reason, the scan timing synchronizer 721 is used to maintain a single "global time" for the system 700 and regularly sends network packets with a number that represents a current global time at which each packet was sent. For example, when a first packet is sent by the scan timing synchronizer 721 to the scanner 702 at time T1 (via the ethernet switch 708), when first packet arrives, the scanner 702 receives the first packet at local time T1' at the scanner 702 and also knows the time T1 at which the first packet was sent. A second packet is sent by the scan timing synchronizer 721 at T2 and the scanner 702 receives the second packet at local time T2' and knows the time T2 at which the second packet was sent. Based on a difference between the times the first and second packets are sent and received, an offset $\Delta$ between global time and local time at the scanners 702 be established as $\Delta=\frac{1}{2}(T1'-T1-T2'+T2)$. The offset $\Delta$ is then used to correct local time to global time. Other scanners are similarly synchronized, and synchronization can be repeated periodically. In this way all scanner clocks are set to system global time and image data is associated with global time. Positions of scan data from different scanners can be established, and if pulsed lasers are used, temporal overlap of laser pulses from different scanners can be avoided.

The single connectors 703, 705 are also used to provide power to the scanners 702, 704 as well as to send and receive timing packets, camera data, and scan control commands. In this example, single cables 703A, 705A terminate at the respective connectors 703, 705 and at the ethernet switch 708 and power distribution is provided by respective power buses 702A, 704A. Each of the scanners 702, 704 directs laser beams to a load 730 (typical logs or lumber) and images the load 730 as indicated schematically at 734, 736, respectively. The load 730 is transported by a log stage 738 that is coupled to an encoder 740 that communicates load position to the scan synchronizer 721 so that load positions for each scanner at each time can be correlated. As a result, each of the scanners 702, 704 can return (X,Y) coordinates of scanned logs or lumber to the ethernet switch and these coordinates can then be communicated to one or more processing systems such as computer 750 to determined how the scanned logs or lumber are to be further processed.

As shown in FIG. 7, communication of power, data, and timing signals are provided to and from each scanner with a single ethernet connector via the ethernet switch 708. The scanners return (X,Y) coordinates of the load, and communication of full images is not required. Timing information (global time packets) are also provided to the scanners via the ethernet connection and the ethernet switch 708. This permits each of the scanners to be compact, limiting thermal distortions which can degrade measurement of loads.

Example 9

Figure 8A:
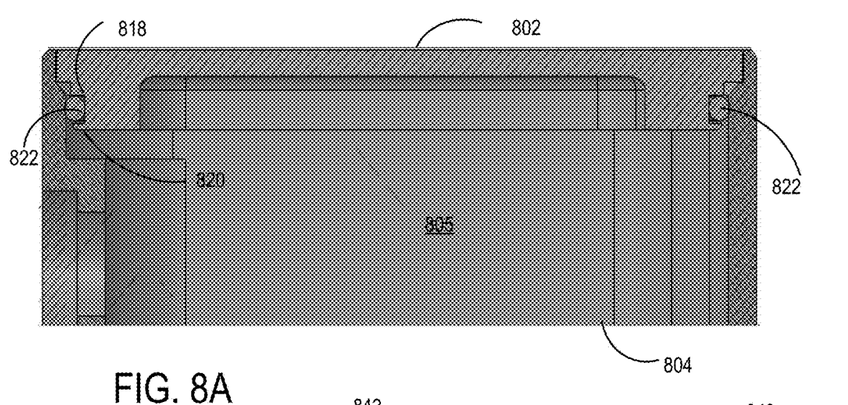
FIGS. 8A-8C illustrate a scanner housing.
Figure 8B:
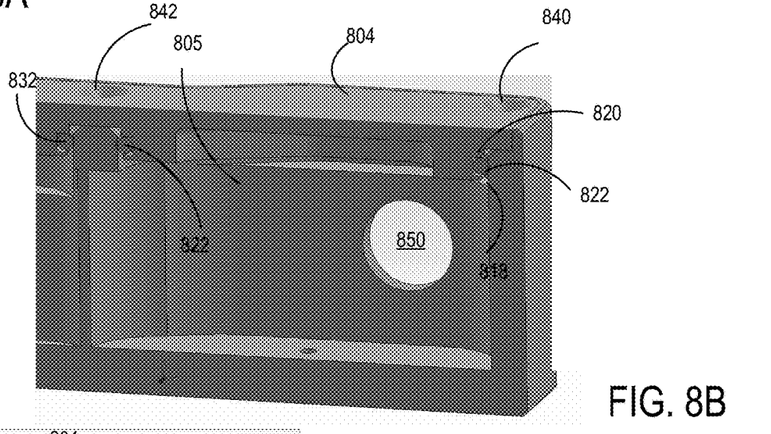
Figure 8C:
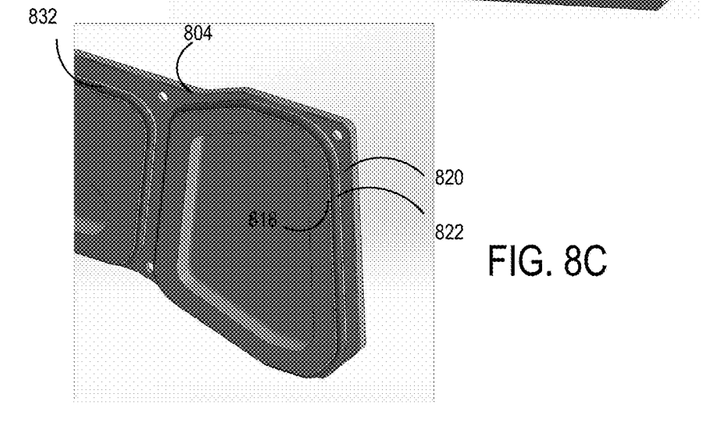

Referring to FIGS. 8A-8C, another representative enclosure 800 includes a single piece container 802 that is sealable with a lid 804. The container 802 defines a cavity 812 in which one or more image processors, laser sources, cameras, clock circuits, and other components can be placed. The cavity 812 is generally divided into a plurality of subcavities that are sealed to the lid 804 with sealing surfaces on container sides and on ribs that separate the subcavities. FIG. 8A shows an O-ring 822 that is retrained in a groove 816 having portions 818, 820 that are situated facing the cavity 812 or away from the cavity 812. As shown in FIGS. 8B-8C, the O-ring 822 seals a subcavity 805 and an O-ring 832 is situated to seal a subcavity 834. The lid 804 can be secured to the container 802 using screws or other fasteners situated in holes 840, 842. While screws of various materials can be used, a low conductivity material (<10, 15, or 20 W/m/K) such as nickel-chromium-iron-molybdenum alloys (for example, Hastelloy) can permit a scanner housing temperature to remain uniform. For example, low thermal conductivity limits distortion-inducing heat from the lid 804 from propagating to a perimeter of the enclosure 802. This is contrary to conventional approaches which distribute heat broadly to control thermal effects.

In view of the many possible embodiments to which the principles of the disclosed technology may be applied, it should be recognized that the illustrated embodiments are only preferred examples and should not be taken as limiting the scope of the disclosure.

We claim:

1. A scan assembly, comprising:
a scan assembly housing that defines an interior volume, the scan assembly housing including a side wall having a sealing surface portion situated proximate a top of an interior surface;
a lid that includes an inward extension having a sealing surface that faces the interior surface the sealing surface portion of the scan assembly housing; and
at least one compressive seal situated between the sealing surface portion of the scan assembly housing and the sealing surface of the lid, wherein the scan assembly housing and the lid, as assembled, compress the compressive seal so that the interior volume of the scan assembly housing is sealed by the lid.

2. The scan assembly of claim 1, further comprising at least one light source operable to project a patterned beam and at least one camera situated to image the projected patterned beam, wherein the at least one light source and the at least one camera are secured to the scan assembly housing and are situated in the interior volume.

3. The scan assembly of claim 2, wherein the at least one camera includes a first camera and a second camera situated so that respective camera axes intersect a measurement volume irradiated by the light source.

4. The scan assembly of claim 3, further comprising:
an image processor coupled to the first camera and the second camera and configured to transmit coordinates associated with imaging of the patterned beam wherein the image processor is thermally coupled to the lid.

5. The scan assembly of claim 4, further comprising a plurality of interior ribs wherein the interior ribs define coupled cavities in an interior of the scan assembly housing and wherein each rib has a sealing surface portion contiguous with the sealing surface portion.

6. The scan assembly of claim 1, further comprising at least one light source operable to project a patterned beam and at least one camera situated to image the projected patterned beam having respective optical axes, wherein the at least one light source and the at least one camera are secured to the scan assembly to orient respective optical axes.

7. The scan assembly of claim 1, wherein the at least one light source is thermally coupled to the lid and mechanically coupled to the scan assembly housing.

8. The scan assembly of claim 2, wherein the at least one light source is a line beam source, and further wherein the optical axes of the first camera and the second camera are at angles of between 5° and 45° with respect to the axis of the line beam source, and the first camera and the second camera are situated equidistant from the line beam source, and the optical axes of the first and second cameras and the line beam source are coplanar.

9. The scan assembly of claim 7, wherein the first camera and the second camera are secured to a bottom of the scan assembly housing that is opposite the lid.

10. The scan assembly of claim 7, wherein the first camera and the second camera are mechanically coupled to the scan assembly housing and thermally coupled to the lid.

11. The scan assembly of claim 3, wherein the axes of the first camera and the second camera are situated symmetrically with respect to an axis of the patterned beam.

12. The scan assembly of claim 11, wherein the first camera and the second camera are secured so that respective camera axes intersect.

13. The scan assembly of claim 1, further comprising:
a data communication port operable to provide data communication for the scan assembly; and
a scanner power supply coupled to the data communication port and operable to power the first camera, the second camera, and the at least one light source based on at least one electrical input to the data communication port.

14. The scan assembly of claim 13, further comprising:
a synchronizer coupled to the data communication port to receive time stamped encoder data and global timing data.

15. The scan assembly of claim 1, further comprising a plurality of fasteners situated to secure the lid to the scan assembly housing, wherein each of the plurality of fasteners is made of a material having a thermal conductivity of less than 20 W/m/K.

16. The scan assembly of claim 14, wherein the fasteners are Hastelloy screws.

17. The scan assembly of claim 1, wherein the side wall of the scan assembly housing includes a seal guide portion that is coupled to the sealing surface portion, wherein the seal guide portion is situated proximate a top of an interior surface of the housing.

18. The scan assembly of claim 1, wherein the lid includes on O-ring groove, and the sealing surface of the lid is situated in the O-ring groove.

19. The scan assembly of claim 2, wherein the at least one light source includes at least one pulsed laser.

20. A method, comprising:
securing at least one optical system to a first housing portion, the optical system having an optical axis associated with receiving or delivering an optical beam;
providing electrical power to the at least one optical system with a communication connection;
thermally coupling heat associated with the at least one optical system to a second housing portion; and
securing the first housing portion to a second housing portion to define an enclosure so that the first housing portion is decoupled from thermal expansion of the second housing portion.

21. The method of claim 20, wherein the securing produces a piston seal between the first housing portion and the second housing portion.

\* \* \* \* \*

UNITED STATES PATENT AND TRADEMARK OFFICE
CERTIFICATE OF CORRECTION

| | | |
|---|---|---|
| PATENT NO. | : 11,924,530 B2 | Page 1 of 1 |
| APPLICATION NO. | : 17/817315 | |
| DATED | : March 5, 2024 | |
| INVENTOR(S) | : Kovalev et al. | |

It is certified that error appears in the above-identified patent and that said Letters Patent is hereby corrected as shown below:

On the Title Page

In the Abstract:
At (57), second sentence "An O-ring can be situated about a perimeter of a lid an inserted into a container to define a sealed volume." should read --An O-ring can be situated about a perimeter of a lid and inserted into a container to define a sealed volume.--

In the Claims

Column 11, Line 36, Claim 1 "a lid that includes an inward extension having a sealing surface that faces the interior surface the sealing surface portion of the scan assembly housing; and" should read --a lid that includes an inward extension having a sealing surface that faces the interior surface of the sealing surface portion of the scan assembly housing; and--

Signed and Sealed this
Nineteenth Day of November, 2024

Katherine Kelly Vidal
*Director of the United States Patent and Trademark Office*